United States Patent
Atchley

(10) Patent No.: US 11,246,334 B2
(45) Date of Patent: Feb. 15, 2022

(54) METHOD AND DEVICE FOR FLAVORING SMOKELESS TOBACCO

(75) Inventor: Frank Atchley, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 1055 days.

(21) Appl. No.: 12/777,838

(22) Filed: May 11, 2010

(65) Prior Publication Data

US 2010/0282267 A1 Nov. 11, 2010

Related U.S. Application Data

(60) Provisional application No. 61/181,266, filed on May 26, 2009, provisional application No. 61/177,238, filed on May 11, 2009.

(51) Int. Cl.
*A24B 15/28* (2006.01)
*A24B 15/18* (2006.01)
*A24B 13/00* (2006.01)
*A23L 27/00* (2016.01)

(52) U.S. Cl.
CPC ............ *A24B 15/283* (2013.01); *A23L 27/72* (2016.08); *A24B 13/00* (2013.01); *A24B 15/186* (2013.01)

(58) Field of Classification Search
None
See application file for complete search history.

(56) References Cited

U.S. PATENT DOCUMENTS

| | | | |
|---|---|---|---|
| 3,913,847 A | 10/1975 | Glatt | |
| 4,528,993 A | 7/1985 | Sensabaugh et al. | |
| 4,655,231 A * | 4/1987 | Ray ..................... | A61K 31/465 131/352 |
| 4,660,577 A | 4/1987 | Sensabaugh et al. | |
| 4,803,082 A * | 2/1989 | Cherukuri .............. | A23G 3/346 424/48 |

(Continued)

FOREIGN PATENT DOCUMENTS

| JP | H09-286729 | 11/1997 |
|---|---|---|
| JP | 2009-508523 | 3/2009 |

(Continued)

OTHER PUBLICATIONS

Gouin, Mircoencapsulation: industrial appraisal of existing technologies and trends, 2004, Trends in Food Science & Technology 15, 330-347.*

(Continued)

*Primary Examiner* — Phu H Nguyen
(74) *Attorney, Agent, or Firm* — Harness, Dickey & Pierce, P.L.C.

(57) ABSTRACT

An encapsulated flavorant or artificial sweetener for use with smokeless tobacco and related products. The encapsulated flavorant or artificial sweetener comprises a core encapsulated with a lipid-based coating that provides stability when in contact with tobacco, yet releases flavor over time when the product is used. The core comprises a carrier, such as silica, tobacco, beet fiber, citrus fiber, artificial sweetener, or the like, coated or loaded with a flavorant. Flavor loading may be in the range of approximately 10% to 60%, by weight. Flavorants include, but are not limited to, methyl salicylate (oil of wintergreen), cinnamon (e.g., cinnamon oil), peppermint (e.g., peppermint oil), and spearmint (oil of spearmint).

16 Claims, 5 Drawing Sheets

(56) References Cited

U.S. PATENT DOCUMENTS

| | | | |
|---|---|---|---|
| 4,987,907 A | 1/1991 | Townend | |
| 5,082,008 A | 1/1992 | Johnson | |
| 5,824,334 A | 10/1998 | Stanley et al. | |
| 6,153,236 A | 11/2000 | Wu et al. | |
| 6,251,478 B1 | 6/2001 | Pacifico | |
| 6,312,741 B1 | 11/2001 | Navarro | |
| 6,616,954 B1 | 9/2003 | Dally et al. | |
| 6,673,383 B2 | 1/2004 | Cain | |
| 6,797,291 B2* | 9/2004 | Richardson | A23K 50/10 424/438 |
| 6,835,397 B2 | 12/2004 | Lee et al. | |
| 2003/0070687 A1 | 4/2003 | Atchley et al. | |
| 2004/0020503 A1* | 2/2004 | Williams | 131/352 |
| 2006/0067984 A1* | 3/2006 | Cavassini et al. | 424/438 |
| 2006/0110494 A1* | 5/2006 | Dusterhoft | A21D 2/02 426/94 |
| 2008/0029110 A1 | 2/2008 | Dube et al. | |
| 2009/0025739 A1* | 1/2009 | Brinkley | A24B 15/183 131/352 |
| 2009/0025741 A1 | 1/2009 | Crawford et al. | |
| 2009/0301504 A1* | 12/2009 | Worthen | A24B 13/00 131/274 |

FOREIGN PATENT DOCUMENTS

| | | |
|---|---|---|
| WO | WO1998/15191 | 4/1998 |
| WO | WO2003/041521 | 5/2003 |
| WO | WO2007/037962 | 4/2007 |
| WO | WO2008/146176 | 12/2008 |
| WO | WO2008/152526 | 12/2008 |
| WO | WO2009/015142 | 1/2009 |
| WO | WO2010/132444 | 11/2010 |

OTHER PUBLICATIONS

Korean Authorized Officer Sung Ho Cho, International Search Report for Application No. PCT/US2010/034381, dated Dec. 16, 2010, 2 pages.

European Search Report in Application No. 10775400.4, dated Feb. 5, 2013, 8 pages.

International Preliminary Report on Patentability in International Application No. PCT/US2010/034381, dated Nov. 24, 2011, 6 pages.

Japanese Office Action in Japanese Office Action No. 2012-510934, dated Mar. 25, 2015, 11 pages.

* cited by examiner

Average relative estimated cumulative concentration (µg/g) of cinnamaldehyde in samples measured from aqueous artificial saliva fractions collected from flow-through dissolution by GCMS (n=2). Error bars represent 1 standard deviation.

Estimated release rates based on best-fit exponential trend-lines applied to cumulative release profiles of cinnamaldehyde. Release rate is estimated to be approximately equal to the slope of each curve.

METHOD AND DEVICE FOR FLAVORING SMOKELESS TOBACCO

This application claims benefit of and priority to U.S. Provisional Application No. 61/177,238, filed May 11, 2009, by Frank S. Atchley, and U.S. Provisional Application No. 61/181,266, filed May 26, 2009, by Frank S. Atchley, and is entitled to those filing dates for priority. The specifications, figures and complete disclosures of U.S. Provisional Application Nos. 61/177,238 and 61/181,266 are incorporated herein by specific reference for all purposes.

FIELD

The present invention relates to a method and device for flavoring tobacco products. More particularly, the present invention relates to a method and device for extended release of flavor in smokeless tobacco products using encapsulation technology.

BACKGROUND

Smokeless tobaccos products are orally consumed without subjecting the product to combustion. These products are manufactured in a variety of forms including chewing tobacco, dry snuff and moist snuff. Generally, these types of products are made as follows with the steps being in no particular order: cutting or grinding the tobacco into a suitable size; dipping or spraying the tobacco with a casing solution; partially drying the cased tobacco; holding the tobacco in containers for a period of time; and packaging the tobacco. See, for example, U.S. Pat. Nos. 4,528,993; 4,660,577; and 4,987,907; the specifications, drawings and complete disclosures of which are incorporated herein by specific reference for all purposes.

Many orally-delivered forms of smokeless tobacco exist, including, but not limited to, moist smokeless tobacco, chewing tobacco, plug tobacco, snuff, snus, films, capsules, and tablets. Moist smokeless tobacco ("MST") is a smokeless tobacco product comprising chopped and/or shredded tobacco. MST is placed into the mouth by an adult consumer and typically removed from the mouth at some point following placement. Some smokeless tobacco products may have organoleptic properties that do not appeal to some consumers. To provide a variety of products with different taste characteristics, chewing tobacco and snuffs are often treated with a variety of flavorants and other flavor enhancing materials. In some cases, smokeless tobacco products are flavored with liquid flavorants to provide, for example, peppermint, spearmint, cinnamon, apple, peach, whiskey, or wintergreen flavor, among others.

A common problem encountered with the application of flavorants to smokeless tobacco products is the loss of flavor over time with exposure to moisture, oxidation, basic pH, evaporation, and the like. Most commercial encapsulated coatings are not sufficiently stable in moist smokeless tobacco products because the protective shell coating degrades relatively rapidly with time and releases flavor before the adult consumer has an opportunity to consume the product to a desired end point. The flavor is then subject to oxidative and chemical degradation, and the result is a minimally sustainable release of flavor and/or a reduced effective shelf life.

The issue in using encapsulation technologies to flavor smokeless tobacco is twofold: flavor stability and flavor release. The typical spray-dried, compacted, maltodextrin-based encapsulated flavors work in a dry environment where a flavored product usually has a 5% to 7% moisture content. They are stable but readily release flavor in the mouth. Smokeless tobacco products, on the other hand, typically have a moisture content of 30% or more. Immediate flavor release is important in all products. Dry products do not usually need "front-end" release, but need release in the approximately 5 to 10 minute range. Moist products do need immediate "front-end" release, yet also need gradual release throughout usage. It is a challenge to balance flavor stability during storage and appropriate flavor release during use by an adult consumer.

DETAILED DESCRIPTION OF EXEMPLARY EMBODIMENTS

Figure 1:
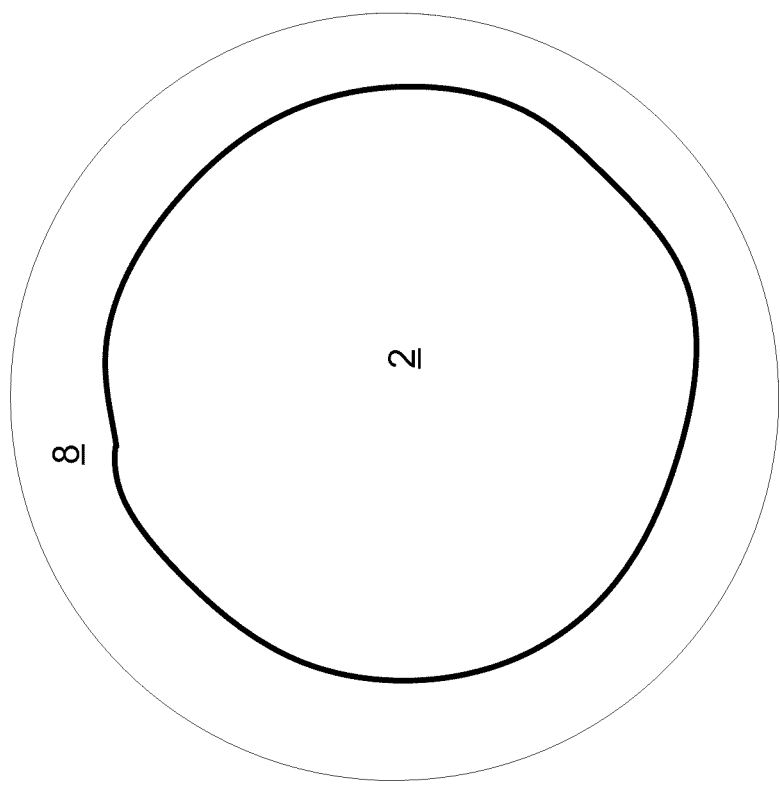
FIG. 1 shows a cutaway view of an encapsulated flavorant in accordance with an exemplary embodiment of the present invention.

In one exemplary embodiment, the device comprises an encapsulated flavorant for use with smokeless tobacco and other products with high moisture content (e.g., 30% or more).

The encapsulated flavorant comprises a core 2 encapsulated with a coating 8. The core 2 comprises a carrier coated or loaded with a flavorant. Flavorants include, but are not limited to, methyl salicylate (oil of wintergreen), cinnamon (e.g., cinnamon oil), peppermint (e.g., peppermint oil), and spearmint (oil of spearmint). Flavorants may include a single flavorant, or a combination of flavorants. Flavorants also may include one or more sweeteners, including artificial sweeteners such as, but not limited to, saccharin or aspartame.

The carrier may be of any suitable size or shape, and formed of any suitable material. In one exemplary embodiment, the carrier is of a size and shape corresponding to the cut of the tobacco product with which the encapsulated flavorant will be mixed or blended. The size and shape depends on the tobacco product size to prevent segregation. In one particular embodiment, the carrier is formed from silica, and is roughly spherical in shape, with a particle size of 125 to 1000 μm. In other embodiments, the carrier is formed from beet fiber, citrus fiber, coffee beans, silica, artificial sweetener (including, but not limited to, saccharin or aspartame), ground cinnamon, other spices or tobacco, or some combination thereof.

The carrier is loaded with a flavorant, which is plated onto, agglomerated with, or absorbed into the carrier. The amount of flavor loading (i.e., the amount of flavor as compared to the total weight of the carrier and flavorant) can vary. In one exemplary embodiment, flavor loading on the carrier is in the range of approximately 10% to approximately 60% by weight. In another embodiment, flavor loading is approximately 20% to approximately 30% by weight.

The coating 8 may be any suitable coating that is relatively stable in contact with smokeless tobacco or other product with moisture content. In one exemplary embodiment, the coating is a lipid that continuously coats the core 2. The lipid coating may be a monoglyceride or triglyceride, or some combination thereof. In one exemplary embodiment, the coating is hydrogenated soybean oil. The coating may further include coloring agents, so that the color of the encapsulated flavorant matches or blends with the tobacco product with which it will be mixed. In other embodiments, the coating may comprise a gelatin or carbohydrate-based coating.

The encapsulation process may be any encapsulation process known in the art, including spray chilling, spray drying, spinning disk, coacervation, or some form of fluid bed process. Examples of encapsulation processes are described in U.S. Pat. Nos. 3,913,847; 6,153,236; 6,251,478; 6,312,741; 6,616,954; 6,673,383; 6,797,291; and 6,835,397; the specifications, drawings and complete disclosures of which are incorporated herein by specific reference for all purposes.

The resulting encapsulated flavorant is mixed with various blends of tobacco product. Liquid flavorants or sweeteners also may be used in the blend. The encapsulated flavorant has a higher stability in the pH, high moisture, and high salt environment formed while in contact with the tobacco product (or other product with moisture content) during storage, yet releases the flavor over time when the product is used. In one exemplary embodiment, the melting point of the encapsulated flavorant is 135° F., or above.

In another exemplary embodiment, a coating as described above may be used in conjunction with a core comprising an artificial sweetener in whole or in part. The artificial sweetener may comprise a single type of artificial sweetener or a combination of two or more artificial sweeteners. Artificial sweetener also may be applied to a core in the same manner as a flavorant, as described above. The weight ratio of sweetener to coating may vary, with the sweetener comprising from approximately 10% to approximately 90% by weight. In one embodiment, the ratio may be approximately 50% sweetener, 50% coating. In another embodiment, the ratio may be approximately 70% sweetener, 30% coating. A flavorant may or may not be used. Liquid flavorants or sweeteners may be mixed with the encapsulated sweetener in various blends of tobacco products.

As used herein, "tobacco" refers to any part, e.g., leaves or lamina and stems, of burley, dark air-cured, dark-fired, flue cured, oriental, cigar filler or wrapper, and rare and/or specialty tobaccos. Tobacco suitable for use in the invention can be whole leaves or stems, or the tobacco may be shredded, cut, or otherwise processed. The cut of the tobacco also may vary; in one embodiment, a long cut tobacco is used. Long cut tobacco typically has an average length of approximately 5/16 of an inch. Shorter cut lengths are used to make snuff products and longer cut lengths are used to make extra long cut products. Tobacco may be in the form of a finished smokeless tobacco product, including but not limited to, moist snuff, dry snuff, or chewing tobacco. For example, tobacco can be fermented or unfermented tobaccos, cured (e.g., air cured), burley, dark, dark-fired, flue cured, oriental, and cigar filler or wrapper. The tobacco can be mixed with other additives or flavors as known in the smokeless tobacco art. Hence, the percentages used herein with respect to tobacco may be with respect to tobacco alone or to tobacco in combination with various known additives.

Chewing tobacco and snuffs are often treated with any of a number of flavors to diminish some of the less desirable taste characteristics sometimes associated with the tobacco. The addition of flavors requires solvent systems for spraying, which are generally added during the preparation process of tobacco products. The method of spraying can be costly and the flavor can sometimes deteriorate during product preparation and upon storage.

After choosing an appropriate tobacco type, the tobacco can be chopped or ground to an appropriate size depending on the type of smokeless tobacco product being made. The material can be further separated based on size by passing the cut tobacco over a screen for sizing. The methods of chopping or grinding of the tobacco may be accomplished using the methods known in the art for that purpose.

As described herein, the moisture content, the pH, and the salt concentration of tobacco is critical in preparing palatable flavored smokeless tobacco. Moisture content, pH, and salt concentration of tobacco can be measured using methods known to those of skill in the art. Tobacco suitable for use in the invention typically has a moisture content of between 25% and 60%, e.g., at least 25%, 30%, 35%, 40%, 45%, 50%, 55%, or 60%; a pH of between 7.0 and 8.5, e.g., at least 7, or 8; and a salt concentration of between 1% and 10%, e.g., at least 1%, 2%, 3%, 4%, 5%, 6%, 7%, 8%, 9%, or 10%.

EXAMPLES

Example 1

An encapsulated flavorant was formed by plating a cinnamon flavorant on a silicon dioxide carrier and encapsulating using the fluid bed process. Three variations of an encapsulating coating were used: 100% monoglyceride; 50% monoglyceride:50% triglyceride; and 100% triglyceride. The melting point for all three variations was 135° F.

Example 2

An encapsulated flavorant was formed by plating a cinnamon flavorant on a silicon dioxide carrier and encapsulating using the fluid bed process. The coating was 100% triglyceride with a melting point of 135° F. Two variations of colorant were added: red and brown.

Example 3

An encapsulated flavorant was formed by plating a cinnamon flavorant on a silicon dioxide carrier and encapsulating using the fluid bed process. The coating was 100% triglyceride with a melting point of 160° F. Two variations of colorant were added: red and brown.

Example 4

An encapsulated flavorant was formed by plating a wintergreen flavorant on a silicon dioxide carrier and encapsulating using the fluid bed process. The coating was 100% triglyceride with a melting point of 160° F. Variants of brown colorant were added. Sweeteners, such as, but not limited to, Sucralose, saccharin, Aspartame and Ace K, also were added.

Example 5

An encapsulated flavorant was formed by agglomerating a cinnamon flavorant with a tobacco particle carrier and encapsulating using the fluid bed process. Three variations of an encapsulating coating were used: 100% monoglyceride; 50% mono glyceride:50% Triglyceride; and 100% triglyceride. The melting point for all three variations was 135° F.

Example 6

An encapsulated flavorant was formed by agglomerating a cinnamon flavorant with a tobacco particle carrier and encapsulating using the fluid bed process. The coating was 100% monoglyceride with a melting point of 135° F. Variations of an artificial sweetener were added, including, but not limited to, sucralose.

Example 7

An encapsulated flavorant was formed by agglomerating a wintergreen flavorant with a tobacco particle carrier and an artificial sweetener to form a particle size of approximately 1 mm to 3 mm and encapsulating the particles using the fluid bed process. The coating was 50% monoglyceride:50% triglyceride with a melting point of 135° F. The final product comprises 35% (by weight) of tobacco particle carrier (15 μm to 30 μm in size), 10% wintergreen flavorant, 4.8% silicon dioxide (used as a seed in the agglomeration process), 0.2% sweetener, and 50% coating.

Example 8

An encapsulated flavorant was formed by agglomerating a wintergreen flavorant with a tobacco particle carrier and an artificial sweetener to form a particle size of approximately 1 mm to 3 mm and encapsulating the particles using the fluid bed process. The coating was 50% monoglyceride:50% triglyceride with a melting point of 135° F. The final product comprises 35% (by weight) of tobacco particle carrier (approximately 200 μm in size), 10% wintergreen flavorant, 4.8% silicon dioxide (used as a seed in the agglomeration process), 0.2% sweetener, and 50% coating.

Example 9

An encapsulated flavorant was formed by agglomerating a wintergreen flavorant with a tobacco particle carrier and an artificial sweetener to form a particle size of approximately 1 mm to 3 mm and encapsulating the particles using the fluid bed process. The coating was 50% monoglyceride:50% triglyceride with a melting point of 135° F. The final product comprises 45% (by weight) of tobacco particle carrier (approximately 200 μm in size), 10% wintergreen flavorant, 4.8% silicon dioxide (used as a seed in the agglomeration process), 0.2% sweetener, and 40% coating.

Example 10

An encapsulated flavorant was formed by agglomerating a wintergreen flavorant with a tobacco particle carrier and an artificial sweetener to form a particle size of approximately 1 mm to 3 mm and encapsulating the particles using the fluid bed process. The coating was 50% monoglyceride:50% triglyceride with a melting point of 135° F. The final product comprises 55% (by weight) of tobacco particle carrier (approximately 200 μm in size), 10% wintergreen flavorant, 4.8% silicon dioxide (used as a seed in the agglomeration process), 0.2% sweetener, and 30% coating. Tobacco or any other substrate used as a carrier can be sized for application.

250 μm may be used for "long cuts." Other mesh sizes should match or be approximately equal to the tobacco particle size to prevent segregation.

Examples of specific flavor or artificial sweetener encapsulate compositions (by approximate weight percent) include the following:

1. 34.5% lipid coating (35:65 triglyceride:monoglyceride)
   32% methyl salicylate (wintergreen flavorant)
   32% silica (carrier)
   0.5% Black Lake Suspension OB #58027 (colorant)
   1.0% Brown Lake Suspension #56119 (colorant)
2. 48.5% lipid coating (50:50 triglyceride:monoglyceride)
   25% methyl salicylate (wintergreen flavorant)
   24.5% silica (carrier)
   1.5% Black Lake Suspension OB #58027 (colorant)
   0.5% Brown Lake Suspension #56119 (colorant)
3. 48.5% lipid coating (50:50 triglyceride:monoglyceride)
   25% methyl salicylate (wintergreen flavorant)
   24.5% silica (carrier)
   0.5% Black Lake Suspension OB #58027 (colorant)
   1.5% Brown Lake Suspension #56119 (colorant)
4. 34% lipid coating (75:25 triglyceride:monoglyceride)
   32% methyl salicylate (wintergreen flavorant)
   32% silica (carrier)
   1.0% Black Lake Suspension OB #58027 (colorant)
   1.0% Brown Lake Suspension #56119 (colorant)
5. 48.5% lipid coating (75:25 triglyceride:monoglyceride)
   25% methyl salicylate (wintergreen flavorant)
   24.5% silica (carrier)
   1.0% Black Lake Suspension OB #58027 (colorant)
   1.0% Brown Lake Suspension #56119 (colorant)
6. 34.5% lipid coating
   25% methyl salicylate (wintergreen flavorant)
   28.5% beet fiber (carrier)
   11% silica (carrier)
   0.5% Black Lake Suspension OB #58027 (colorant)
   0.5% Brown Lake Suspension #56119 (colorant)
7. 34% lipid coating
   25% methyl salicylate (wintergreen flavorant)
   23.5% citrus fiber (carrier)
   16% silica (carrier)
   0.5% Black Lake Suspension OB #58027 (colorant)
   1.0% Brown Lake Suspension #56119 (colorant)
8. 35% lipid coating
   14% methyl salicylate (wintergreen flavorant)
   50% tobacco (carrier)
   1% silica (carrier)
9. 35% lipid coating
   14% methyl salicylate (wintergreen flavorant)
   50% tobacco (carrier)
   1% silica (carrier)
10. 47% lipid coating
    26% methyl salicylate (wintergreen flavorant)
    25% silica (carrier)
    2% colorant
11. 30% lipid coating
    34% methyl salicylate (wintergreen flavorant)
    34% silica (carrier)
    2% colorant
12. 50% lipid coating
    50% artificial sweetener (saccharin)
13. 30% lipid coating
    70% artificial sweetener (saccharin)

The ratio of triglyceride to monoglyceride in the lipid coatings in these exemplary samples can vary from 100% triglyceride to 100% monoglyceride. Possible ratios include, but are not limited to, 100:0, 90:10, 80:20, 75:25, 50:50 and 0:100 triglyceride:monoglyceride.

Lipid-based coatings are the most successful in moist products, such as smokeless tobacco. These comprise combinations of coating shells around flavor-absorbed silica or other carriers. Thickness of the coating provides more stability. In one embodiment, the system may use liquid flavor in combination with multiple time-released encapsulated flavorants. The liquid flavor provides immediate flavor release, and the encapsulated flavorants provide longer sustained flavor release during the chewing experience.

Testing demonstrates the utility of the encapsulated flavorant or artificial sweetener. Flavor extraction tests were conducted on a variety of flavorants, as discussed below and as depicted in FIGS. 2, 3, 4 and 5.

In one set of tests, cinnamon flavor extraction by flow-through dissolution testing was performed on three samples having the same flavor load:

| Sample | Sample Information |
| --- | --- |
| 9A | 25% Flavor, 25% Silica, 48% lipid-based coating, 2% color |
| 9B | 34.3% Flavor, 34.3% Silica, 29.4% lipid-based coating, 2% color |
| 9C | 34.3% Flavor, 34.3% Silica, 29.4% lipid-based coating (90 Tri/10 Mono), 2% color |

A 2 gram portion of each sample was analyzed in duplicate using an Erweka USP-4 dissolution apparatus. Dissolution parameters used to collect time fractions are as follows:

| | |
| --- | --- |
| Nominal Flow Rate | 4 ml/min |
| Lifts per minute | 120 |
| Temperature | 37° C. |

| Fraction Collection | |
| --- | --- |
| Time | Fraction Collection Interval |
| 0-15 minutes | 3 minutes |
| 15-50 minutes | 5 minutes |
| 50-60 minutes | 10 minutes |
| Total Analysis Time | 60 minutes |

Dissolution occurred over one hour to collect aqueous, timed fractions, and an aliquot of each fraction was back extracted with hexane containing quinoline (40.2 µg/ml) internal standard. A portion of this organic extract was analyzed by GCMS profiling methodology modified for detection of cinnamaldehyde. The estimated concentration for each of the two replicates at each time point were averaged, and values reported as relative concentration of cinnamaldehyde in each sample.

Figure 2:
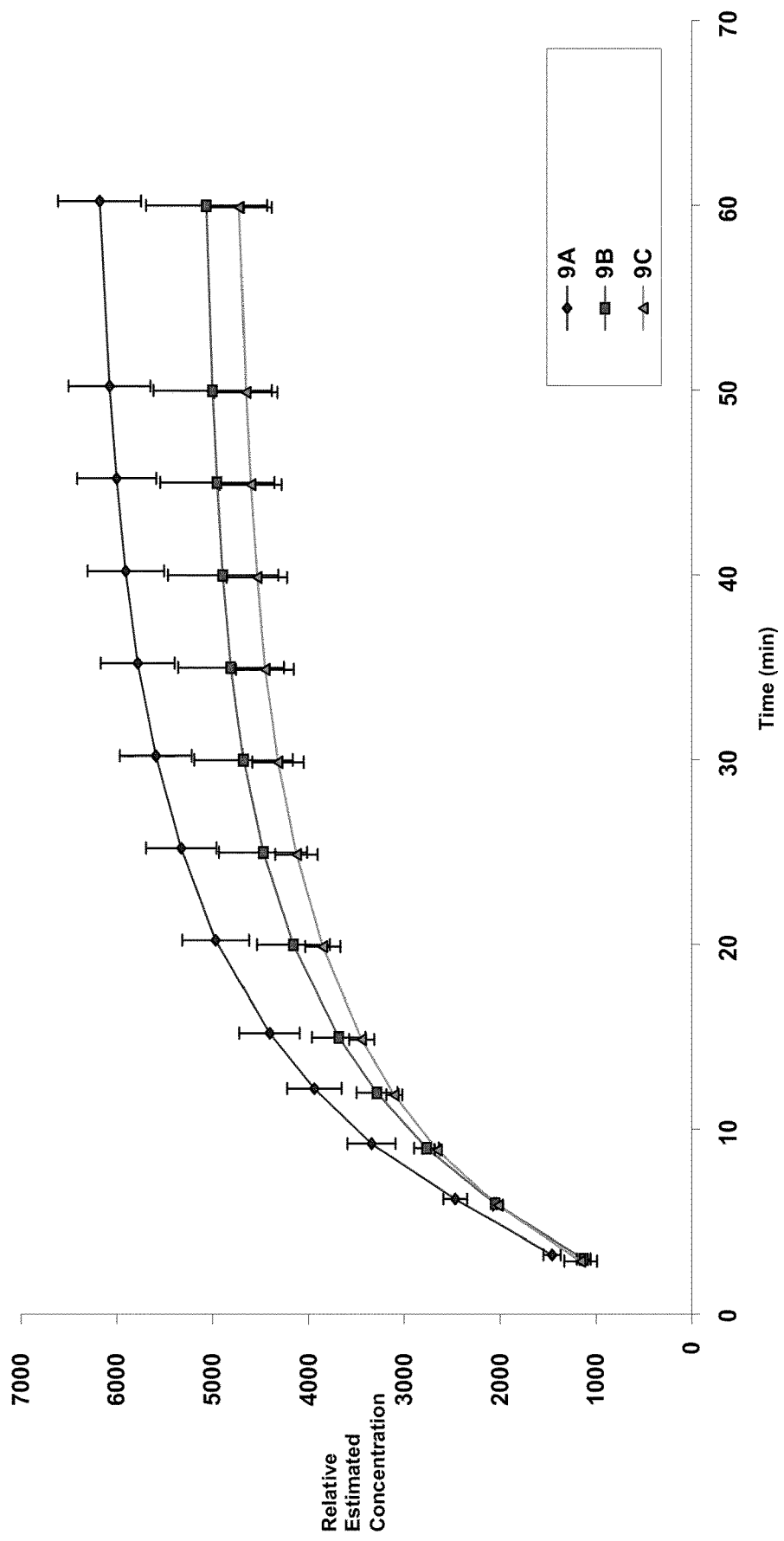
FIG. 2 shows the average relative estimated cumulative concentration of cinnamaldehyde in samples measured from aqueous artificial saliva fractions collected from flow-through dissolution.
Figure 3:
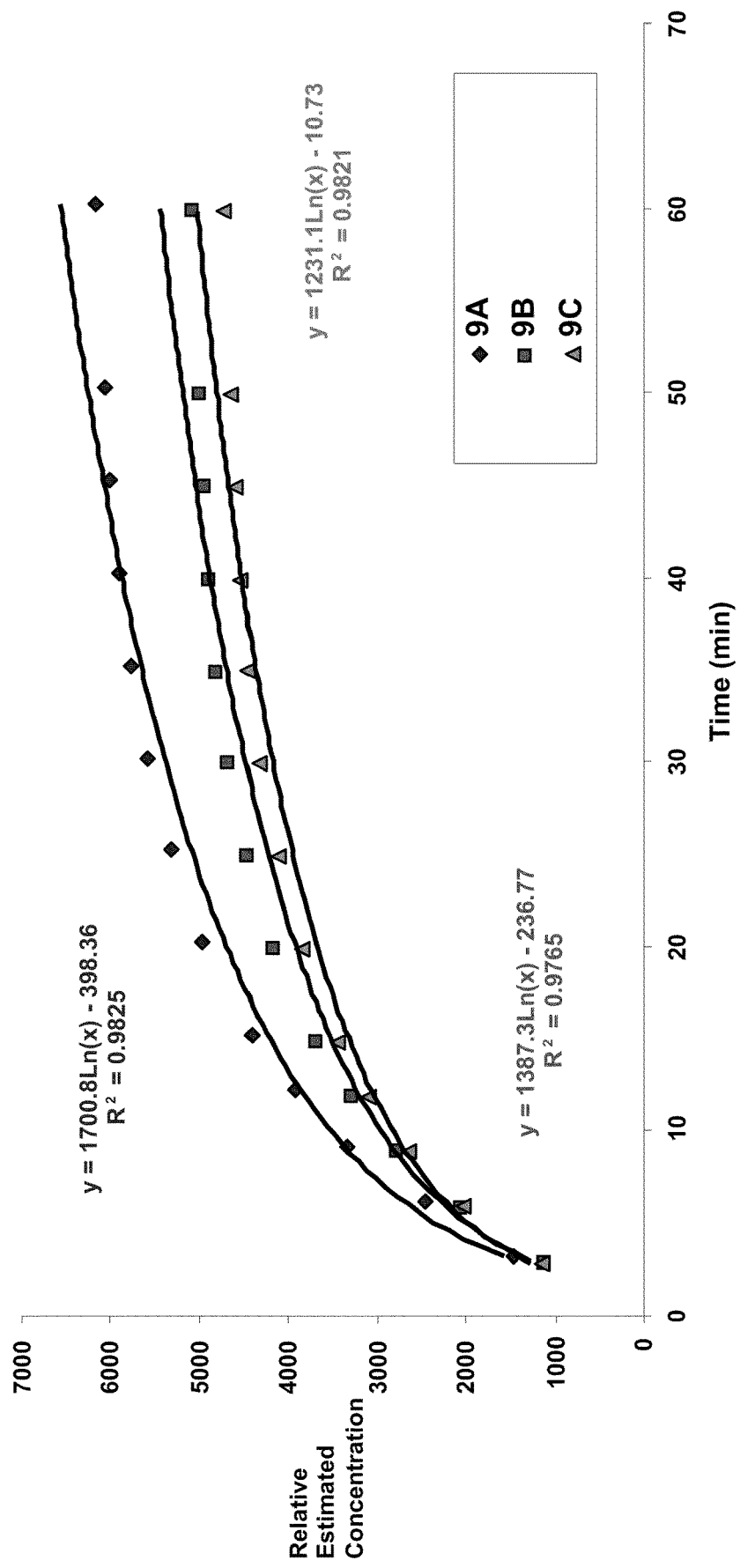
FIG. 3 shows the estimated release rates based on best-fit exponential trend-lines applied to cumulative release profiles of cinnamaldehyde.

Relative average cumulative cinnamaldehyde concentration (n=2) measured in each fraction collected are shown in the table below. The resulting release profiles for cinnamaldehyde from the samples are plotted as relative average concentration versus time and are shown in FIGS. 2 and 3. Rate of release and total amount of cinnamaldehyde released was found to be higher for sample 9A relative to samples 9B and 9C.

| 9A | | 9B | | 9C | |
| --- | --- | --- | --- | --- | --- |
| Time (min) | Cinnamaldehyde (µg/g) | Time (min) | Cinnamaldehyde (µg/g) | Time (min) | Cinnamaldehyde (µg/g) |
| 3.2 | 1461 | 2.8 | 1129 | 3.2 | 1161 |
| 6.2 | 2467 | 5.8 | 2053 | 6.2 | 2025 |
| 9.2 | 3342 | 8.8 | 2767 | 9.2 | 2655 |
| 12.2 | 3940 | 11.8 | 3286 | 12.2 | 3104 |
| 15.2 | 4407 | 14.8 | 3685 | 15.2 | 3445 |
| 20.2 | 4967 | 19.8 | 4160 | 20.2 | 3852 |
| 25.2 | 5325 | 24.8 | 4472 | 25.2 | 4126 |
| 30.2 | 5591 | 29.8 | 4678 | 30.2 | 4320 |
| 35.2 | 5780 | 34.8 | 4807 | 35.2 | 4453 |
| 40.2 | 5905 | 39.8 | 4890 | 40.2 | 4539 |
| 45.2 | 6000 | 44.8 | 4951 | 45.2 | 4603 |
| 50.2 | 6074 | 49.8 | 5000 | 50.2 | 4653 |
| 60.2 | 6178 | 59.8 | 5063 | 60.2 | 4724 |

In another set of tests, wintergreen flavor extraction by flow-through dissolution testing was performed on nine samples:

| Sample | Sample Information |
| --- | --- |
| 10A | 2.6% liquid flavor |
| 10B | 2.6% liquid flavor |
| 10C | 2.6% liquid flavor |
| 10D | 2.6% liquid flavor + 0.4% encap (tri:mono) |
| 10E | 2.6% liquid flavor + 0.4% encap (tri:mono) |
| 10F | 2.6% liquid flavor + 0.4% encap (90 tri:10 mono) |
| 10G | 3.0% liquid flavor |

Sample 10G comprises liquid flavor (3%) added to the product, and serves as a control. Samples 10A, 10B, and 10C comprise liquid flavor (2.6%) added to the product. Sample 10D comprises liquid flavor (2.6%) added to the product with a triglyceride:monoglyceride blend of encapsulated flavor (0.4% equivalent flavor). Sample 10E comprises liquid flavor (2.6%) added to the product with a different triglyceride:monoglyceride blend of encapsulated flavor (0.4% equivalent flavor). Sample 10F comprises liquid flavor (2.6%) added to the product with a 90:10 triglyceride:monoglyceride blend of encapsulated flavor (0.4% equivalent flavor).

A 2 gram portion of each sample was analyzed in duplicate using an Erweka USP-4 dissolution apparatus. Dissolution occurred over one hour to collect aqueous, timed fractions, and an aliquot of each fraction was taken for HPLC analysis for determination of methyl salicylate. Dissolution method parameters are the same as given above.

After collection, a portion of each fraction was transferred to an auto-sampler vial and subjected to HPLC analysis by UV detection. Samples were injected directly onto HPLC without further sample preparation. The duplicates for each time point were averaged, and values reported as relative concentration of methyl salicylate in each sample. Analytical conditions for HPLC methodology are as follows:

| | |
| --- | --- |
| Flow Rate | 1.2 ml/min |
| Column | Agilent SB-C8 4.6 × 50 mm |
| Column Temperature | 40° C. |
| Injection volume (Direct) | 2 µl |
| Instrument | Agilent 1200 |
| Solvent A | 60.0% H2O - 0.1% Formic Acid |
| Solvent B | 40.0% MeOH |

-continued

| Gradient | |
|---|---|
| Time | % Solvent B |
| 0.00 | 40.0 |
| 3.00 | 90.0 |
| 4.00 | 90.0 |
| 4.20 | 40.0 |
| Detector Wavelength | 240 nm |

Figure 4:
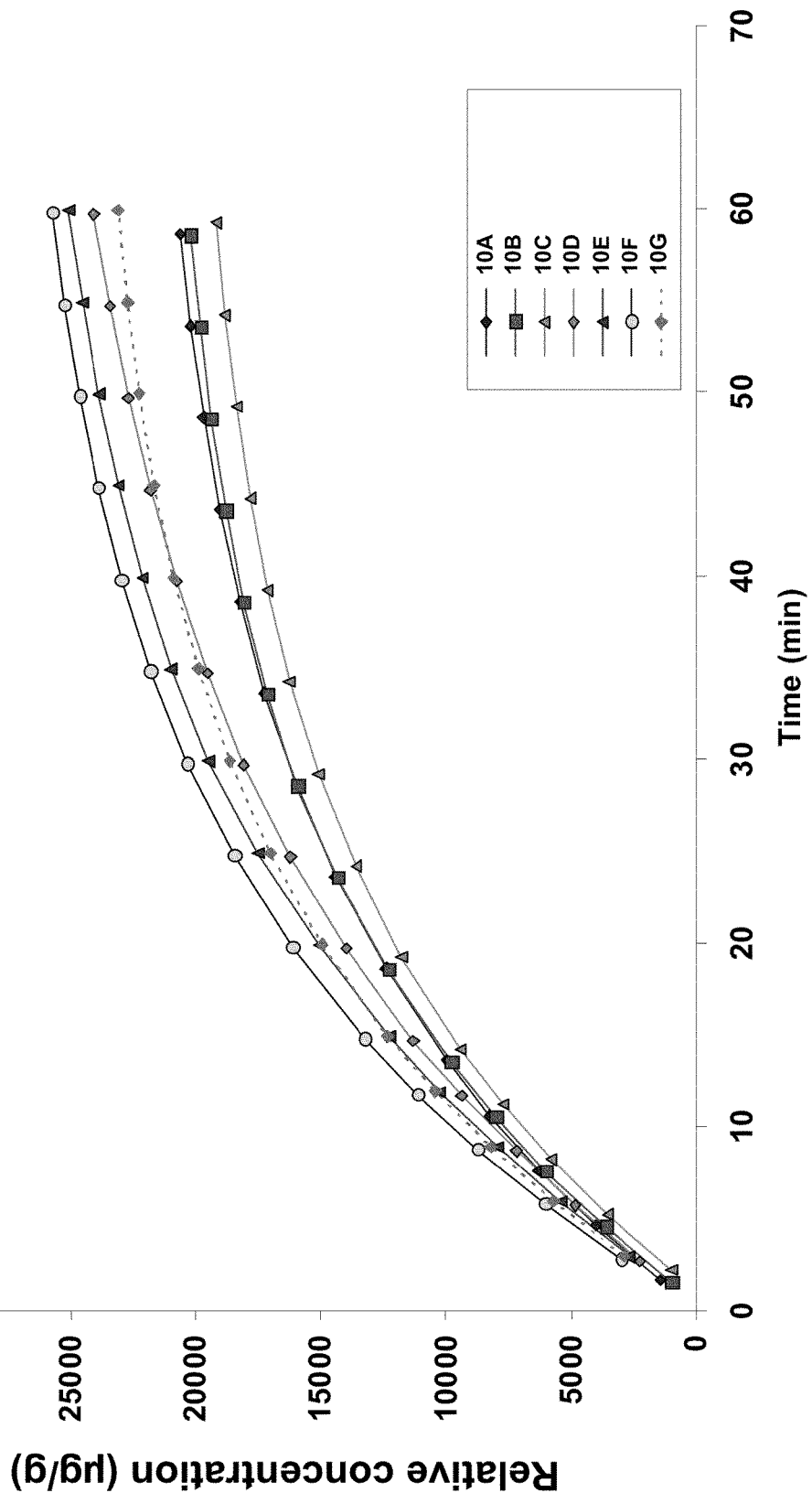
FIG. 4 shows the average relative estimated cumulative concentration of methyl salicylate in samples measured from aqueous artificial saliva fractions collected from flow-through dissolution.

Results are depicted in FIG. 4 and demonstrate the improved flavor release of the encapsulated flavorants.

In another set of tests, saccharin extraction by flow-through dissolution testing was performed on seven samples:

| Sample | Sample Information |
|---|---|
| 11A | 0.161% saccharin, 2.6% liquid flavor |
| 11B | 0.171% saccharin, 2.6% liquid flavor |
| 11C | 0.177% saccharin, 2.6% liquid flavor |
| 11D | 0.1% saccharin, 2.6% liquid flavor + 1.56% encap (tri:mono) |
| 11E | 0.1% saccharin, 2.6% liquid flavor + 1.17% encap (tri:mono) |
| 11F | 0.1% saccharin, 2.6% liquid flavor + 1.17% encap (90 tri:10 mono) |
| 11G | 2.6% liquid flavor |

Sample 11G comprises liquid flavor (2.6%) added to the product, and serves as a control. Samples 11A, 11B, and 11C comprise encapsulated saccharin added to the product, with 50% of the total saccharin encapsulated. The encapsulated saccharin coating in samples 11A and 11B comprises a triglyceride:monoglyceride blend, while the coating in sample 11C comprises a 90:10 triglyceride:monoglyceride blend. The percentage of saccharin in the encapsulate for samples 11A, 11B and 11C is 55.5%, 68.0%, and 76.1%, respectively. Sample 11D comprises liquid flavor (2.6%) added to the product with a triglyceride:monoglyceride blend of encapsulated flavor (1.56% equivalent flavor). Sample 11E comprises liquid flavor (2.6%) added to the product with a different triglyceride:monoglyceride blend of encapsulated flavor (1.17% equivalent flavor). Sample 11F comprises liquid flavor (2.6%) added to the product with a 90:10 triglyceride:monoglyceride blend of encapsulated flavor (1.17% equivalent flavor).

Figure 5:
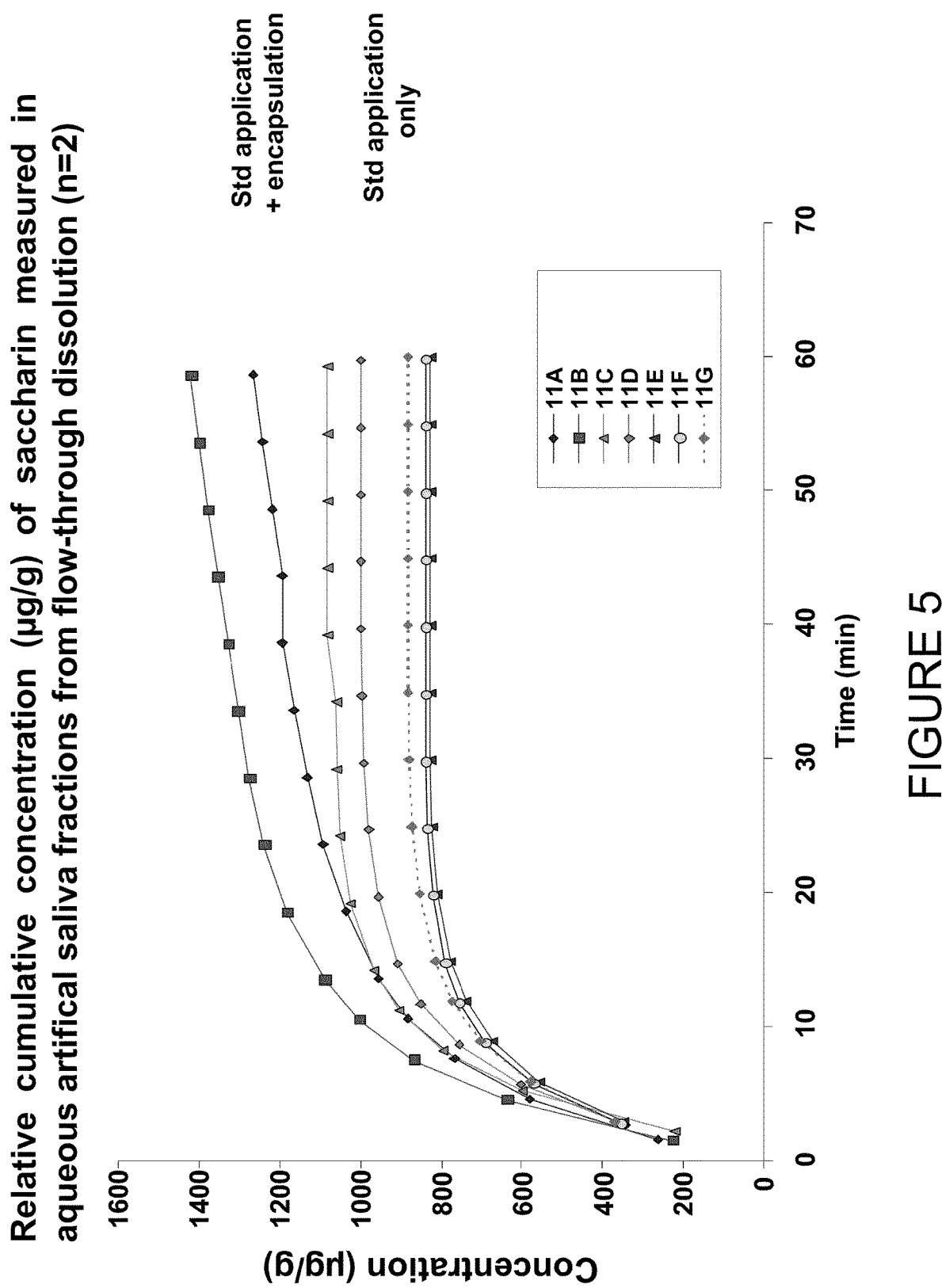
FIG. 5 shows the relative cumulative concentration of saccharin in samples measured in aqueous artificial saliva fractions from flow-through dissolution.

Flow-through dissolution testing was performed as described above. Results are depicted in FIG. 5 and demonstrate the improved release of the encapsulated artificial sweetener.

Thus, it should be understood that the embodiments and examples have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An encapsulated flavor composite, comprising:
   a solid core including,
      a carrier including silica, and
      a flavor component, the flavor component being plated onto the carrier, agglomerated with the carrier, absorbed into the carrier, or any combination thereof, an amount of the carrier ranging from 24% to 51% of the encapsulated flavor composite, and an amount of the flavor component ranging from 14% to 34% of the encapsulated flavor composite; and
   a lipid coating continuously surrounding the solid core, the lipid coating present in an amount ranging from 30% by weight to 50% by weight of the encapsulated flavor composite and including a combination of a monoglyceride and a triglyceride, the lipid coating including a ratio of monoglyceride to triglyceride of 10:90,
   wherein the encapsulated flavor composite is configured to be combined with a smokeless tobacco product having a moisture content greater than about 30%,
   wherein the encapsulated flavor composite is configured to be stable in the smokeless tobacco product, the smokeless tobacco product having a salt concentration of 1% to 10%, and
   wherein the encapsulated flavor composite has a particle size ranging from 1 mm to 3 mm.

2. The encapsulated flavor composite of claim 1, wherein the flavor component comprises methyl salicylate.

3. The encapsulated flavor composite of claim 1, wherein the flavor component comprises cinnamon.

4. The encapsulated flavor composite of claim 1, wherein the flavor component comprises an artificial sweetener.

5. The encapsulated flavor composite of claim 1, wherein the carrier further comprises tobacco, citrus fiber, beet fiber, or any combination thereof.

6. The encapsulated flavor composite of claim 1, wherein the lipid coating is applied to the solid core in a fluid bed process.

7. The encapsulated flavor composite of claim 1, wherein the lipid coating is configured to be stable in a packaged tobacco product.

8. The encapsulated flavor composite of claim 1, wherein the flavor component is present in an amount ranging from 20% by weight to 50% by weight of the solid core.

9. The encapsulated flavor composite of claim 1, wherein the flavor component is configured to be time-released.

10. The encapsulated flavor composite of claim 1, wherein the encapsulated flavor composite is configured to be combined with another flavor composite having a different time-release period, and the smokeless tobacco product.

11. The encapsulated flavor composite of claim 10, wherein the encapsulated flavor composite is configured to be combined with a liquid flavorant, the other flavor composite, and the smokeless tobacco product.

12. The encapsulated flavor composite of claim 1, wherein the encapsulated flavor composite is configured to be combined with a liquid flavorant and the smokeless tobacco product.

13. A product, comprising:
   tobacco; and
   the encapsulated flavor composite of claim 1.

14. An encapsulated flavor composite, comprising:
   a core including,
      a carrier comprising silica, and
      a non-liquid flavor component, an amount of the carrier ranging from 24% to 51% of the encapsulated flavor composite, and an amount of the flavor component ranging from 14% to 34% of the encapsulated flavor composite; and
   a lipid coating continuously surrounding the core, the lipid coating present in the encapsulated flavor composite in an amount ranging from 30% by weight to 50% by weight, the lipid coating including a combination of a monoglyceride and a triglyceride, and the lipid coating including a ratio of monoglyceride to triglyceride of 10:90, wherein the encapsulated flavor composite is configured to be combined with a smokeless tobacco product having a moisture content greater than about 30%, wherein the encapsulated flavor composite is configured to be stable in a smokeless tobacco product having a salt concentration of 1% to 10%, and wherein the encapsulated flavor composite has a particle size ranging from 1 mm to 3 mm.

15. An encapsulated artificial sweetener composite, comprising:

a solid core consisting of, an artificial sweetener present in an amount greater than or equal to 50% by weight of the encapsulated artificial sweetener composite, and one or more flavorants, an amount of the flavor component ranging from 14% to 34% of the encapsulated flavor composite; and a lipid coating continuously surrounding the solid core, the lipid coating present in the encapsulated flavor composite in an amount ranging from 30% by weight to 50% by weight, the lipid coating including a combination of a monoglyceride and a triglyceride, and the lipid coating including a ratio of monoglyceride to triglyceride of 10:90, wherein the encapsulated artificial sweetener composite is configured to be combined with a smokeless tobacco product having a moisture content greater than about 30%, wherein the encapsulated artificial sweetener composite is configured to be stable in the smokeless tobacco product, the smokeless tobacco product having a salt concentration of 1% to 10%, and wherein the encapsulated flavor composite has a particle size ranging from 1 mm to 3 mm.

16. The encapsulated artificial sweetener composite of claim 15, wherein the artificial sweetener comprises saccharin.

* * * * *

UNITED STATES PATENT AND TRADEMARK OFFICE
CERTIFICATE OF CORRECTION

| | |
|---|---|
| PATENT NO. | : 11,246,334 B2 |
| APPLICATION NO. | : 12/777838 |
| DATED | : February 15, 2022 |
| INVENTOR(S) | : Frank Atchley |

It is certified that error appears in the above-identified patent and that said Letters Patent is hereby corrected as shown below:

On the Title Page

Item [73], insert --U.S. Smokeless Tobacco Company LLC, Richmond, VA (US)--

Signed and Sealed this
Twenty-eighth Day of March, 2023

Katherine Kelly Vidal
*Director of the United States Patent and Trademark Office*